United States Patent
Friedrich et al.

(10) Patent No.: US 6,637,286 B2
(45) Date of Patent: Oct. 28, 2003

(54) DRIVE DEVICE FOR MOTOR VEHICLE SLIDING SUNROOFS

(75) Inventors: Norbert Friedrich, Wehrheim (DE); Rainer Hattass, Grundau (DE)

(73) Assignee: ArvinMeritor GmbH, Dietzenbach (DE)

(*) Notice: Subject to any disclaimer, the term of this patent is extended or adjusted under 35 U.S.C. 154(b) by 0 days.

(21) Appl. No.: 09/995,957

(22) Filed: Nov. 28, 2001

(65) Prior Publication Data

US 2002/0086752 A1 Jul. 4, 2002

(30) Foreign Application Priority Data

Nov. 30, 2000 (DE) .......................... 100 59 456

(51) Int. Cl.[7] .......................... F16C 1/12; F16H 55/30; F16G 1/28
(52) U.S. Cl. .................... 74/501.6; 74/500.5; 74/502.6; 474/251; 474/153
(58) Field of Search ................ 474/117, 115, 474/901, 251, 153, 138, 148, 101; 74/501.6, 500.6, 89.17, 500.5; 296/223

(56) References Cited

U.S. PATENT DOCUMENTS

| | | | | |
|---|---|---|---|---|
| 4,919,005 A | * | 4/1990 | Schleicher | 296/223 |
| 4,977,708 A | * | 12/1990 | Kloft | 474/117 |
| 5,045,030 A | * | 9/1991 | Cunningham | 474/138 |
| 5,177,871 A | * | 1/1993 | Martenson | 474/117 |
| 5,746,090 A | * | 5/1998 | Boss et al. | 74/89.17 |
| 6,398,681 B1 | * | 6/2002 | Wanie | 474/101 |

FOREIGN PATENT DOCUMENTS

| | | | |
|---|---|---|---|
| DE | 1 246 434 | | 2/1968 |
| DE | 1 555 536 | | 7/1970 |
| DE | 4313687 A1 | * | 11/1994 |
| DE | 19527746 C1 | * | 6/1996 |
| DE | 195 31514 C1 | | 10/1996 |
| DE | 39 10 263 C2 | | 8/1997 |
| DE | 19958523 C1 | * | 1/2001 |
| GB | 2348258 A | * | 9/2000 |
| JP | 07-151209 A | * | 6/1995 |

\* cited by examiner

*Primary Examiner*—Marcus Charles
(74) *Attorney, Agent, or Firm*—Carlson, Gaskey & Olds

(57) ABSTRACT

A quiet drive device for motor vehicle sliding sunroofs is proposed capable of withstanding even strong drive forces and permitting an equal, that is to say, smooth displacement of a cover of the motor vehicle sliding sunroofs. The drive device comprises a toothed belt, which is guided so that two parallel line sections are formed on the toothed belt. On the running line sections the toothed belt, with an external toothing extending without interruption over its outer circumference, is in meshing engagement with two drive cables for a cover. An internal toothing extending without interruption over the inner surface of the toothed belt is in meshing engagement with a toothed pinion that can be driven to rotate in both directions and is partially wrapped by the toothed belt.

20 Claims, 8 Drawing Sheets

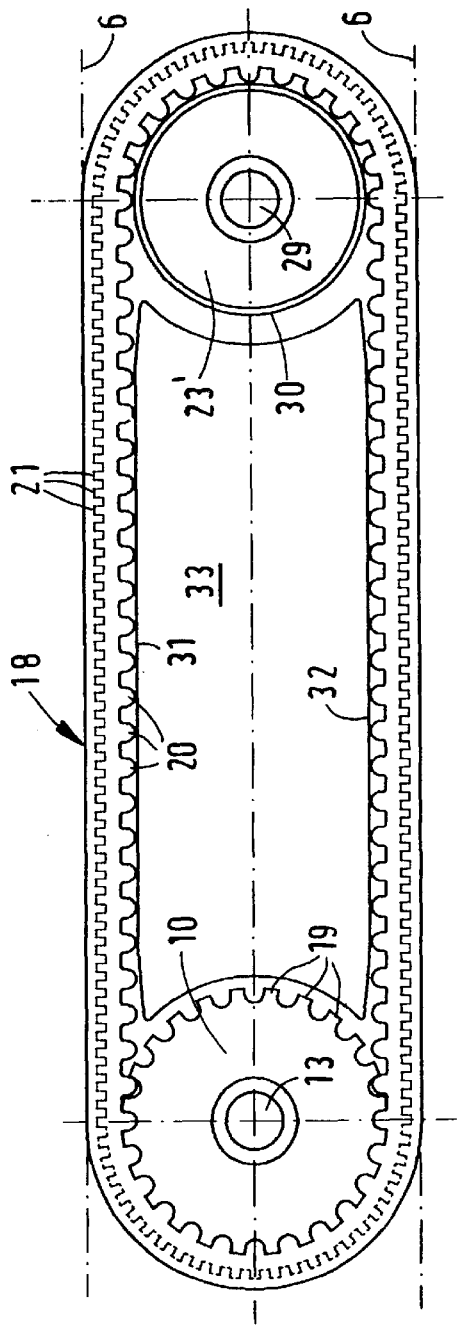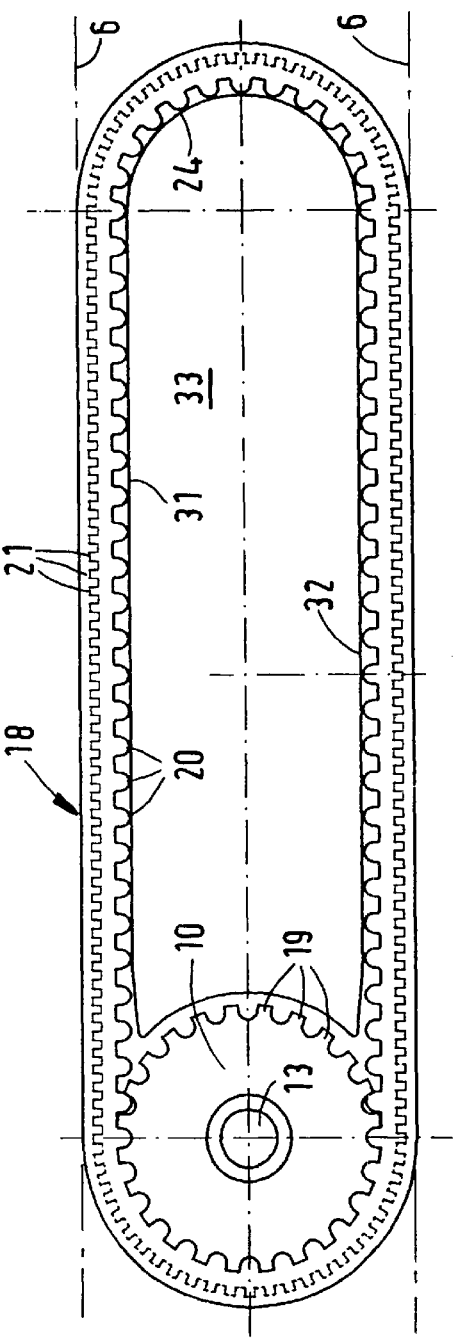

DRIVE DEVICE FOR MOTOR VEHICLE SLIDING SUNROOFS

BACKGROUND OF THE INVENTION

1. Field of the Invention

The invention relates to a drive device for motor vehicle sliding sunroofs.

In particular, the invention relates to a drive device for motor vehicle sliding sunroofs, having a rotatable toothed pinion, which can be driven in both directions of rotation, and two flexible drive cables each provided with a helical wire working winding, which are displaceably guided opposite one another in parallel guide channels where they are rigid in compression, the rotatable toothed pinion being arranged between the two flexible drive cables, each with a helical working winding for converting its rotational movements into opposing displacement movements of said cables.

For the purposes of the present invention the term "motor vehicle sliding sunroof" or "sliding sunroof" is intended to include all design constructions in which at least one cover is adjustably fitted to a roof opening of a motor vehicle and is moveable by means of the drive device. This includes not only design constructions in which the cover, after lowering of its rear edge, is displaceable under the rear fixed roof surface in order to expose the roof opening, but also so-called tilt-or-slide sunroofs, in which the cover, starting from the position in which it closes the roof opening, can also be swivelled about a swivel axis provided in proximity to its front edge for deployment above the fixed roof surface. Finally this definition is also intended to encompass those design constructions in which the cover, after raising of its rear edge, can be displaced rearwards to a greater or lesser extent above the rear fixed roof surface (so-called top-ridge sliding sunroofs, spoiler roofs). Roof design constructions should also be included, in which the minimum of one cover is formed not only from sheet metal or glass, but also as a folding roof made from flexible material.

2. Description of the Related Art

A common feature of all known drive devices of the type referred to in the introductory part (for example, DE 38 03 816 A1, DE 38 09 949 A1, DE 195 31 514 C1) is that the toothed pinion driven by way of hand crank mechanism or an electric geared motor meshes by means of its toothing directly with the working windings of the drive cables in the manner of a rack drive mechanism. Owing to the circular cross-sectional circumference of the wire working winding and the unavoidable dimensional tolerances on the drive cables, the toothed pinion and the guide elements for the drive cables, in these known drive devices it is not possible to achieve an ideal tooth form on the toothed pinion, which would correspond to a normal, optimised gear mechanism. Furthermore it is not possible to ensure that at least one tooth of the toothed pinion meshes with each drive cable at all times, which results in jerky, unequal feeding of the drive cables. At the same time the effective circle of the toothed pinion varies owing to play in the tooth engagement and also due to deflection movements of the drive cable, as a result of which vibrations may be induced that can be transmitted to the frame structure of the sliding sunroof and hence to the vehicle roof itself. This may result in the generation of disturbing noise in adjustment and drive movements of the sliding sunroof, especially when the toothed pinion is driven by an electric motor.

The object of the invention is to provide a drive device of the type referred to in the introductory part, which will permit equal and quiet displacement movements of the two drive cables without inducing vibrations.

SUMMARY OF THE INVENTION

According to the present invention, there is provided a drive device for motor vehicle sliding sunroofs, having a rotatable toothed pinion, which can be driven in both directions of rotation, and two flexible drive cables each provided with a helical wire working winding, which are displaceably guided opposite one another in parallel guide channels where they are rigid in compression, the rotatable toothed pinion being arranged between the two flexible drive cables, each with a helical working winding for converting its rotational movements into opposing displacement movements of said cables; wherein an endless, flexible, toothed belt of high tensile strength is arranged between the rotatable toothed pinion and the two flexible drive cables, the endless, flexible, toothed belt having an inner side on which is provided a complementary internal toothing to the toothing of the rotatable toothed pinion and having an outer side on which is provided a complementary external toothing to the helical working windings of the drive cables; wherein the endless, flexible, toothed belt partially wraps the rotatable toothed pinion and its internal toothing is held in constant frictional engagement with the toothing of the rotatable toothed pinion; and wherein the toothed belt has opposing line sections which are guided parallel to the drive cables and its external toothing on the opposing line sections is held in constant frictional engagement with the working windings of the two flexible drive cables.

The arrangement of a toothed belt in accordance with the invention decouples toothed pinion and drive cable from one another, a majority of teeth of the toothed pinion being in meshing engagement with a majority of teeth of the internal toothing of the toothed belt at all times and a majority of teeth of the external toothing of the toothed belt being in meshing engagement with a majority of succeeding sections of the wire working windings of the two drive cables at all times. In this way a smooth, equal and virtually silent displacement drive of the two drive cables is obtained.

The internal toothing of the toothed belt and the toothed pinion can be in this context advantageously straight-toothed, whilst the external toothing of the toothed belt is helically toothed corresponding to the thread-like helical lead of the wire working winding of the drive cables. The straight toothing of toothed pinion and internal toothing of the toothed belt allow this tooth engagement to be optimised. The external toothing of the toothed belt readily conforms to the thread-like working winding and ensures an engagement free from play, especially since a majority of teeth of the external toothing here mesh with the working windings of the drive cables at all times along rectilinear line sections.

A number of embodiments are envisaged for reversal of the endless toothed belt after the rectilinear and parallel line sections following the toothed pinion partially wrapped by the toothed belt, on which line sections the external toothing of the toothed belt meshes with the working windings of the drive cables.

The toothed belt may be reversed on a pivoted sheave, resulting in minimal friction losses. The sheave may have a toothing corresponding to the toothed pinion, that is to say a further toothed pinion matching the drive toothed pinion may also be used as return sheave, which is itself, however, not independently driven but is only driven to rotate by the driven toothed belt. In this embodiment there is no need for the manufacture of an additional part, that is a non-toothed return sheave.

Instead of a toothed or non-toothed return sheave, however, rounded slide surface may be used, over which the toothed belt is guided, if the slide surface is accordingly matched to the material of the toothed belt in terms of a low coefficient of friction.

The arrangement is advantageously configured so that in the area of the line sections intended for the engagement of its external toothing with the working windings of the drive cables, the toothed belt is guided so that it slides on support surfaces. This measure ensures tooth engagement between the external toothing of the toothed belt and the working windings of the drive cables under all operating conditions.

To simplify the design construction of the drive device, the pivoted sheave or the slide surface and the support surfaces for the toothed belt may be arranged on a support and guide element fixed between the two drive cables. In the case of an electric motor drive, the said support and guide element may be an integral part of the motor/transmission unit.

In an advantageous development of the drive device it is proposed that the tension of the toothed belt be adjustable by means of a tensioning device. Alternatively, however, the arrangement may also be configured so that the tension of the toothed belt is produced by a spring-loaded tensioning device. In this case no adjustment operations are necessary. Furthermore it is ensured in series production and in mass production that if the same springs are used the same tension is imparted to the toothed belts from one drive device to another.

In both alternative arrangements the tensioning device may be operatively connected to the pivoted sheave or the rounded slide surface, that is to say in adjustment of the belt tension or by means of spring force it may exert a displacing action directly on the sheave or the slide surface.

In one embodiment of the tensioning device, this has a tensioning slide, guided so that it is capable of sliding on the support and guide element parallel to the drive cables, on which guide the sheave is supported or the rounded slide surface is fixed. In the case of an adjustable tensioning device design, an adjusting eccentric cam may be provided, fixed to the support and guide element so that it is both rotatable and lockable, the cam bearing on the tensioning slide on that side of the tensioning slide remote from the sheave or the slide surface. When the toothed belt is to be tensioned by spring force, a biased compression spring may be arranged between the support and guide element and the tensioning slide.

BRIEF DESCRIPTION OF THE DRAWINGS

For a better understanding of the invention and to show how the same may be carried into effect, reference will now be made, by way of example, to the accompanying drawings, in which:

FIG. 10 shows a similar top view to FIG. 2, but focussed on the toothed belt and the parts of the drive device directly interacting therewith, with the exception of the drive cables (not shown), in an embodiment of the toothed belt return sheave different from FIG. 2, FIG. 11 shows a top view of an embodiment similar to FIG. 10, in which the toothed belt is reversed on a rounded slide surface.

DESCRIPTION OF THE PREFERRED EMBODIMENTS

Figure 1:
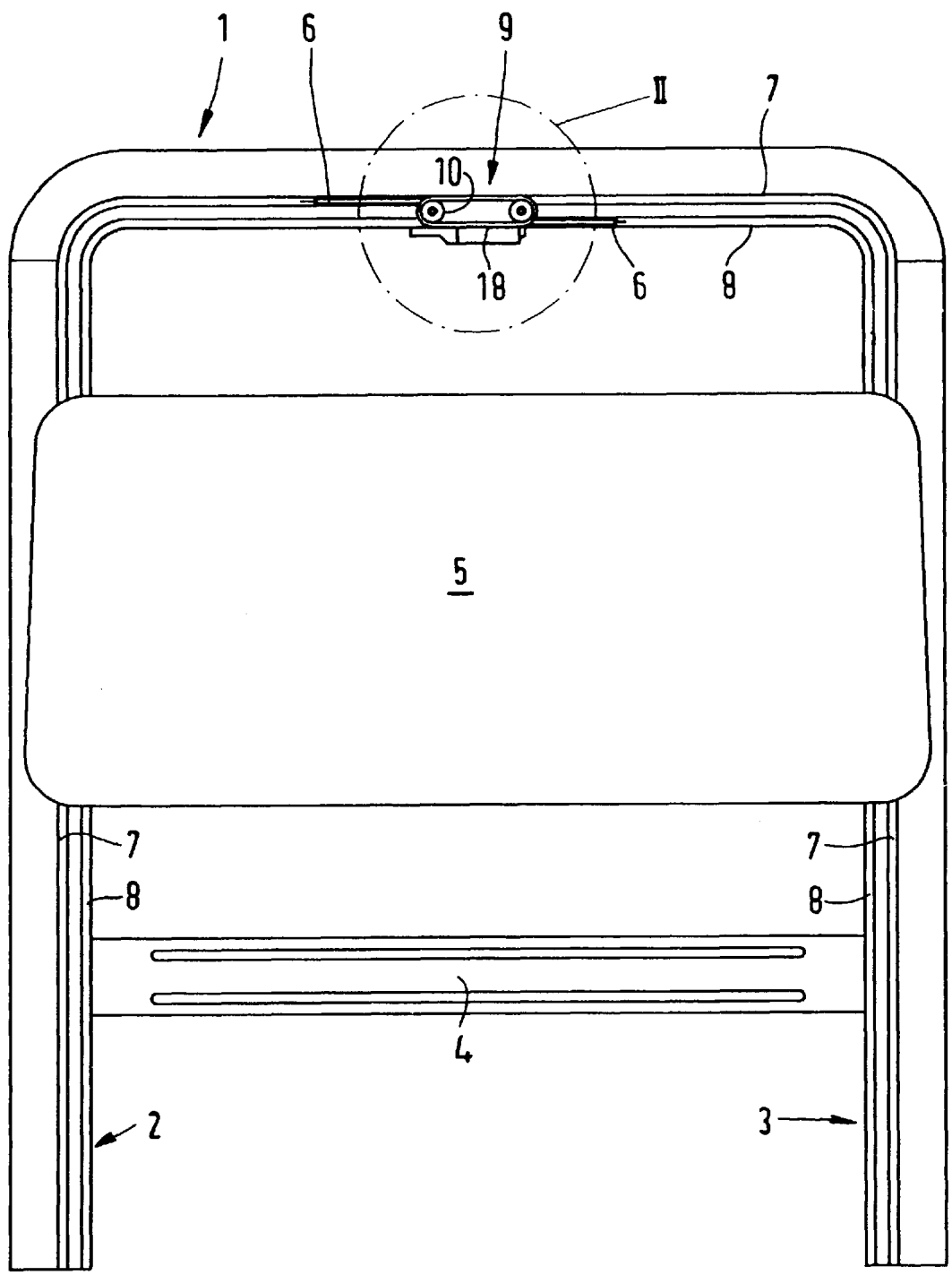
FIG. 1 shows the top view of a sliding sunroof frame with cover and drive device.

The sliding sunroof frame represented in FIG. 1, which can be modularly pre-assembled in a known manner and is intended for fitting to a motor vehicle roof (not shown) provided with a roof opening, essentially comprises a front frame cross member 1, two frame side members 2 and 3 and possibly a middle transverse profile section 4 bracing the frame side members 2, 3 against one another. On the two frame side members 2 and 3 there are generally guide rails, on which a cover 5 assigned to the roof opening is displaceably guided. For sliding movements and any tilting movements the cover 5 is driven by way of two drive cables 6, displaceably guided in guide channels and/or tubes and rigid in compression, one cable being assigned to each side of the cover 5. The guide channels and/or tubes 7 and 8 are merely indicated in FIG. 1 as are the two drive cables 6. The drive device 9, to which the invention relates and which is described in more detail below, is located approximately in the middle of the frame cross member 1.

Figure 2:
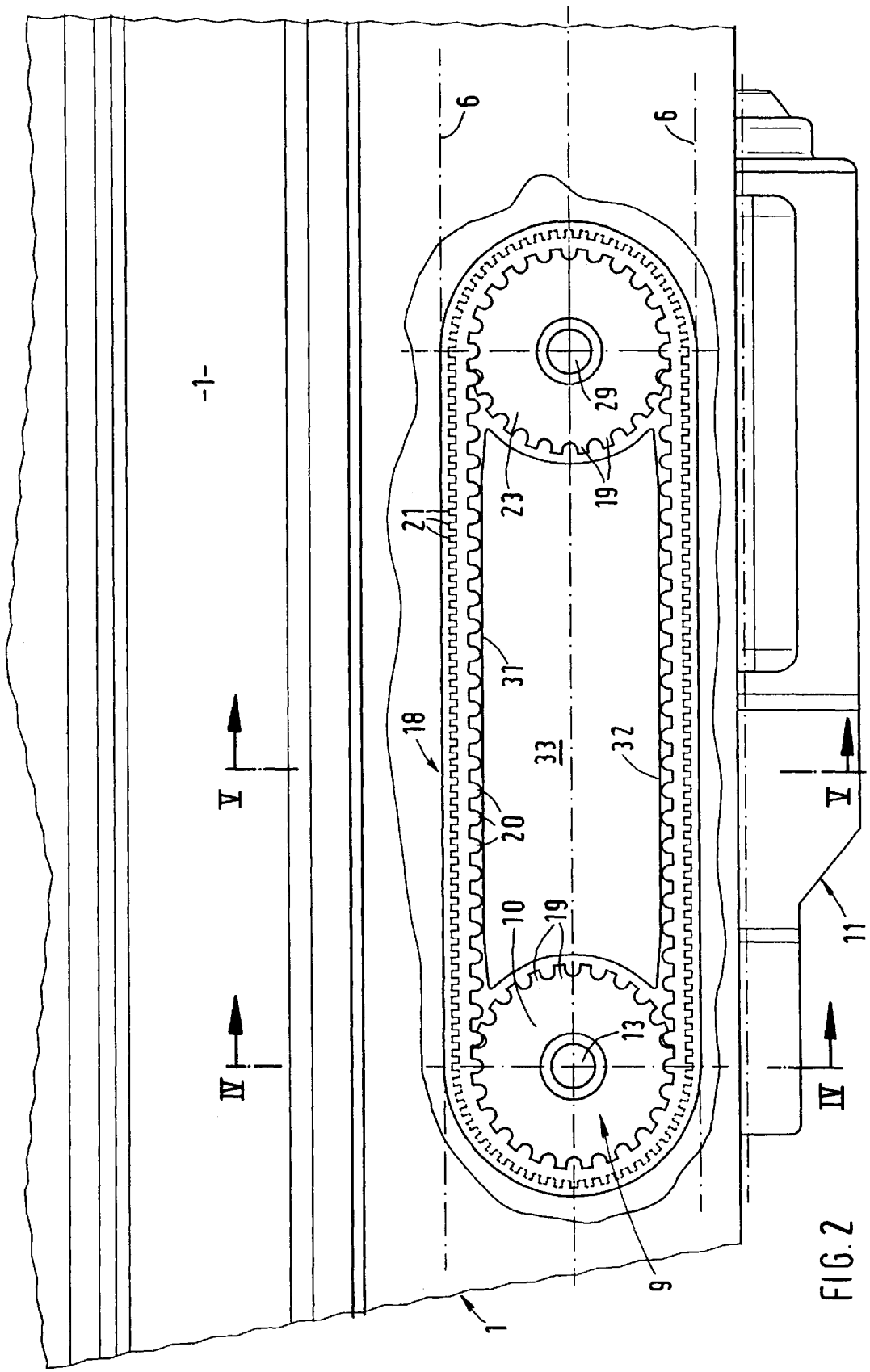
FIG. 2 shows an enlarged top view of the drive device according to the detailed circle II in FIG. 1.

For this purpose reference will first be made to FIGS. 2 and 3 in conjunction with the sectional representations in FIGS. 4 to 6. As will be seen from these, the drive device 6 has a toothed pinion 10, which in the example shown can be driven in both directions of rotation by an electric geared motor 11. The drive pinion 10 is located midway between the two drive cables 6, which are displaceably guided opposite one another in two parallel guide channels 7, 8 where they are rigid in compression. The drive cables 6, at least in the area of the drive device 9, are arranged in a guide profile section 12 (FIGS. 4 to 6), which in order to simplify the drawing is not shown in FIGS. 2 and 3. In FIG. 2 and also in FIGS. 10 to 14, the two drive cables 6 are indicated only by their correspondingly denoted central axes.

Figure 4:
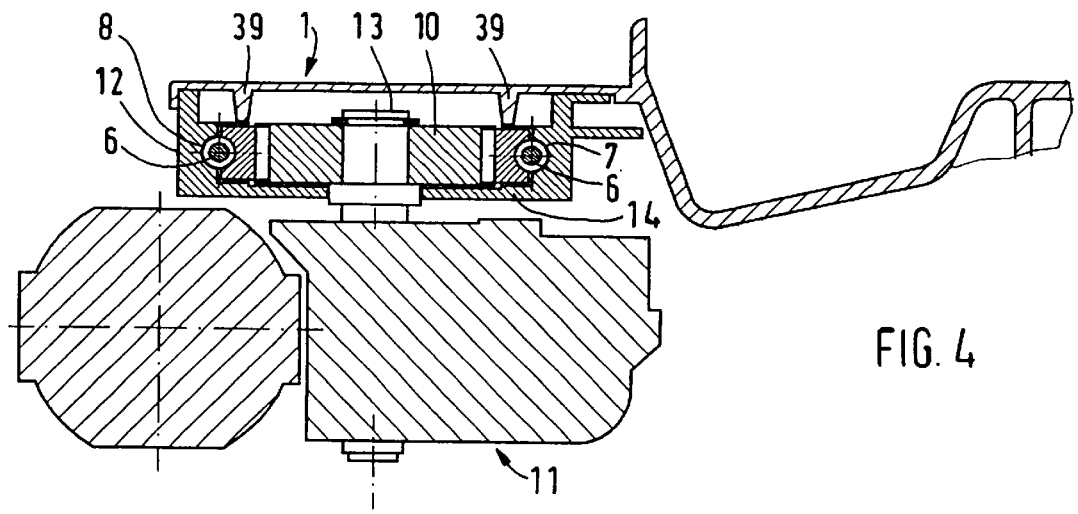
FIG. 4 shows the section along the line of section IV—IV in FIG. 2.
Figure 5:
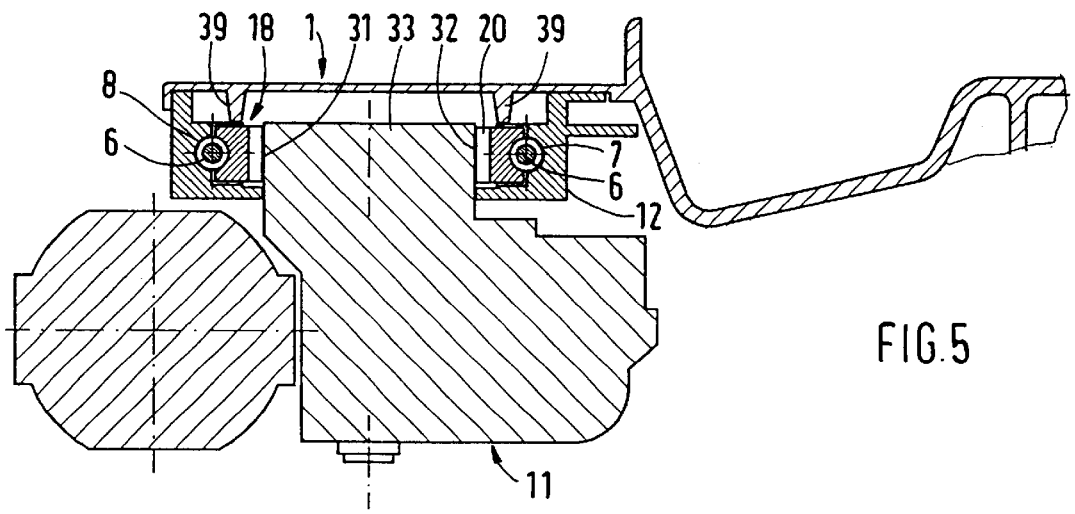
FIG. 5 shows the section along the line of section V—V in FIG. 2.
Figure 6:
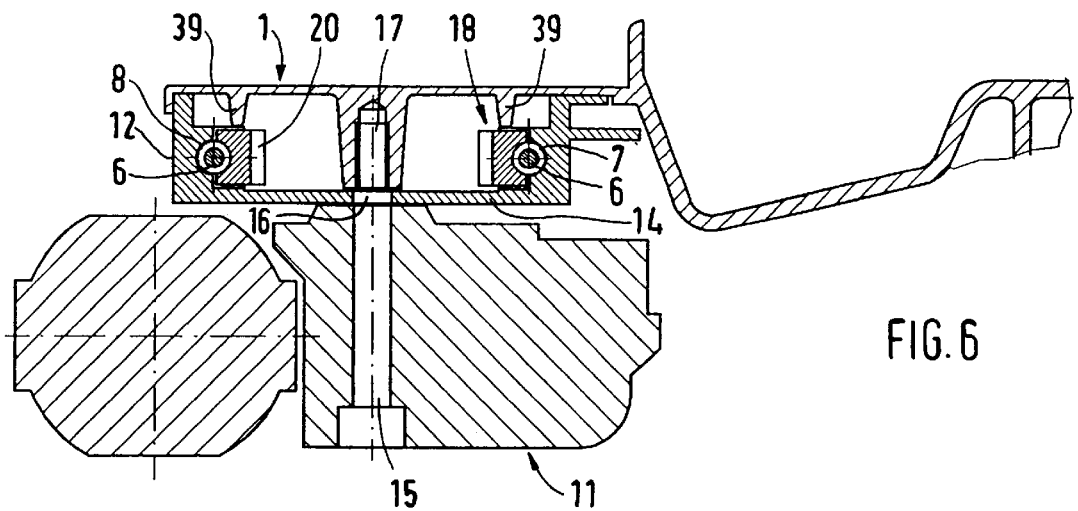
FIG. 6 shows a section similar to the sections in FIGS. 4 and 5, but through a fixing arrangement for the electric geared motor.

The guide profile section 12 open at the top is terminated by the front frame cross member 1, as FIGS. 4 to 6 clearly show. The electric geared motor 11, which with its drive shaft 13 for the toothed pinion 10 is led through the bottom web 14 of the guide profile section 12 (FIG. 4), the guide profile section 12 and the frame cross member 1 are fixed to one another by screws (not shown), as will be apparent from the example of one of the fixing arrangements in FIG. 6. For this purpose a locating hole 15 for each screw is provided in the block of the electric geared motor 11, the hole aligning with through-hole 16 in the web 14 and a tapped hole 17 in the frame cross member 1. When a screw is introduced into this hole arrangement 15, 16, 17 and tightened, the guide profile section 12 is firmly held with all elements located thereon between the geared motor 11 and the frame cross member.

Figure 9:
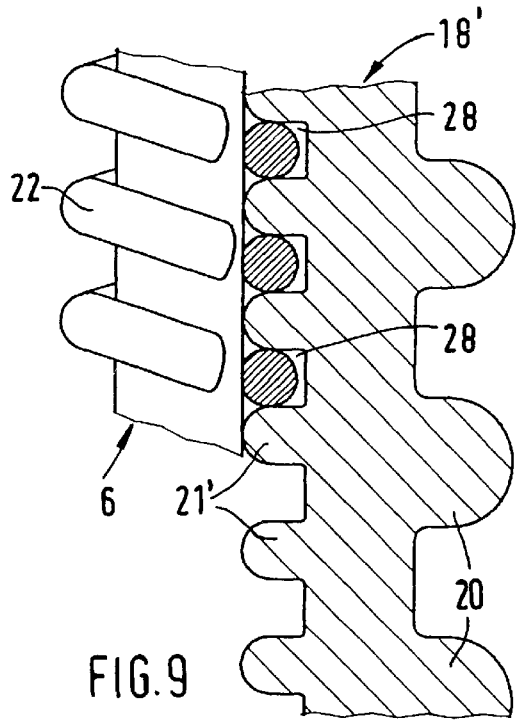
FIG. 9 shows the detached section through the toothed belt along the line of section IX—IX in FIG. 8, but with a detached drive cable meshing with the toothed belt and represented partially in cross-section.

An endless, flexible toothed belt 18 of high tensile strength, which may be formed from a plastic belt with or without reinforcing intermediate layer, is arranged between the toothed pinion 10 and the two drive cables 6. The reinforcing intermediate layer may be a metal strip of high reverse bending strength, which is covered with a suitable elastomer plastic. The intermediate layer at the same time gives the toothed belt 18 the necessary tensile strength and dimensional stability. On its inner side the toothed belt 18 is provided with a complementary internal toothing 20 to the toothing 19 of the toothed pinion 10. On its outer side the toothed belt 18 is provided with an external toothing 21, which is complementary to the helical round wire working winding 22 usual in drive cables 6 of this type. In FIGS. 3 and 9 the drive cable 6 with its working winding 22 is represented in longitudinal sections.

The toothed belt 18 partially wraps the toothed pinion 10, that is over an angle of 180° in all the exemplary embodiments shown, and is also led with a corresponding contact angle around a return sheave 23 (FIGS. 2, 13) or 23' (FIGS. 10, 12, 14) or a rounded slide surface 24 (FIG. 11). In the area of contact on the toothed pinion 10 the toothed belt 18 is held by its internal toothing 20 in constant, meshing engagement with the toothing 19 of the toothed pinion 10.

The toothed pinion 10 and the return sheave 23 or 23', or the slide surface 24 are separated at a distance from one another, so that the toothed belt 18 forms opposing, rectilinear line sections parallel to the drive cables 6. On these line sections the external toothing 21 of the toothed belt 18 is held in constant engagement with the working windings 22 of the drive cables 6. It will be seen from these conditions under which the relevant components of the drive device engage that, depending on the direction of rotation, a rotational drive of the toothed pinion 10 will drive the toothed belt 18 in one or the other direction of rotation. The toothed belt 18 in turn drives the drive cables 6 and displaces the latter in opposite directions in the guide channels 7, 8. If in the arrangement according to FIG. 2, for example, the toothed pinion is driven clockwise, the toothed belt 18 also runs clockwise over the toothed pinion 10 and the return sheave 23. In so doing the outer drive cable 6 in FIG. 2 is displaced to the right and the inner drive cable 6 to the left.

Since the toothed pinion 10 in the drive device according to the invention no longer meshes directly with the working windings 22 of the drive cables 6, helical toothing is not necessary for the toothed pinion 10. The toothing 19 of the toothed belt 10 may therefore be designed as straight toothing. The internal toothing 20 of the toothed belt 18 is accordingly then also straight-toothed.

Figure 7:
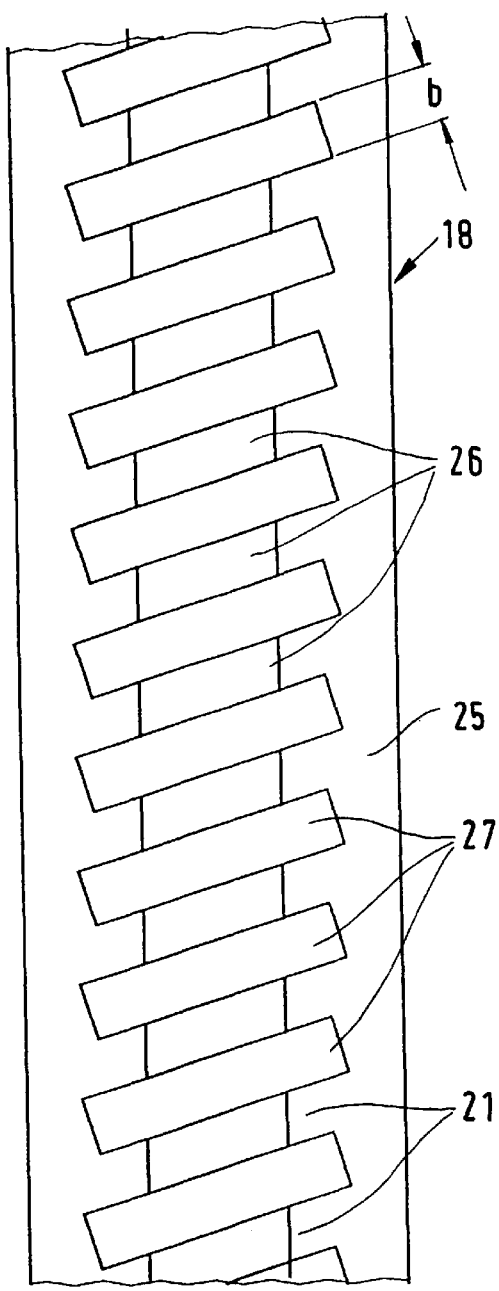
FIG. 7 shows the detached view of the toothed belt viewed in the direction of the arrow VII in FIG. 3, in a first embodiment of the external toothing of the toothed belt.

The external toothing 21 of the toothed belt 18, on the other hand, is helically toothed according to the helical lead of the working winding 22 of the drive cable 6, as is apparent from FIG. 7. From FIG. 7 in conjunction with the sectional representations in FIGS. 4 to 6 the following can be inferred with regard to the tooth geometry of the external toothing 21.

In the rectilinear line sections of the toothed belt 18 the outer surface 25 is a plane surface, into which core recess 26 and tooth recesses 27 of different size are alternately formed. The core recesses 26 are matched to the core diameter of the drive cable 6, whilst the tooth recesses 27 are matched to the outside diameter of the working winding 22. The axial intervals of the tooth recesses 27 are defined by the "lead" of the working winding 22, whilst the width b (see FIG. 7) of the tooth recesses 27 is matched to the wire diameter of the working winding 22. The core recesses 26 and the tooth recesses 27 together form the external toothing 21, which approximates to a complementary embossing of the drive cables 6. The teeth of the external toothing 21 are formed by the convex ribs set at an angle, which are situated between each two tooth recesses 27.

Figure 8:
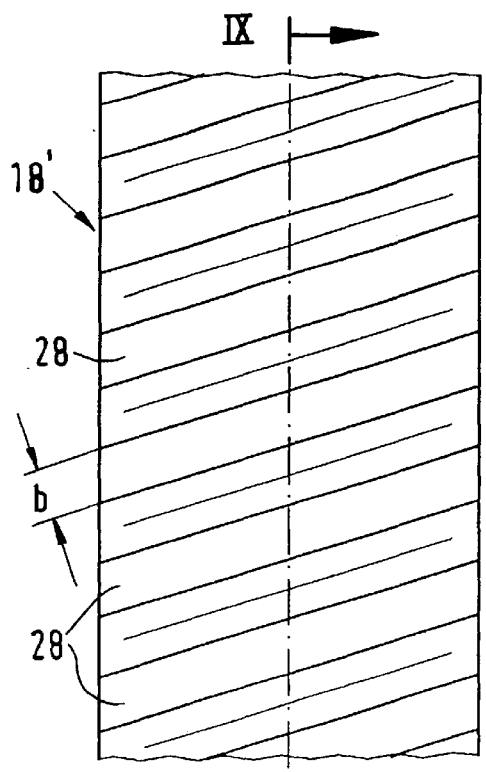
FIG. 8 shows a further detached view of the toothed belt in a second embodiment of the external toothing of the toothed belt.

In the embodiment according to FIGS. 8 and 9 rectilinear grooves 28 set at an angle are formed at equal intervals into the outer surfaces of the toothed belt 18', the grooves being matched to the "lead" of the working winding 22. The groove width b (see FIG. 8) is matched to the wire diameter of the working winding 22, as FIG. 9 clearly shows. The external, rounded ribs, set at an angle, which are formed between the grooves 28, form the external toothing 21' of the toothed belt 18'.

Figure 13:
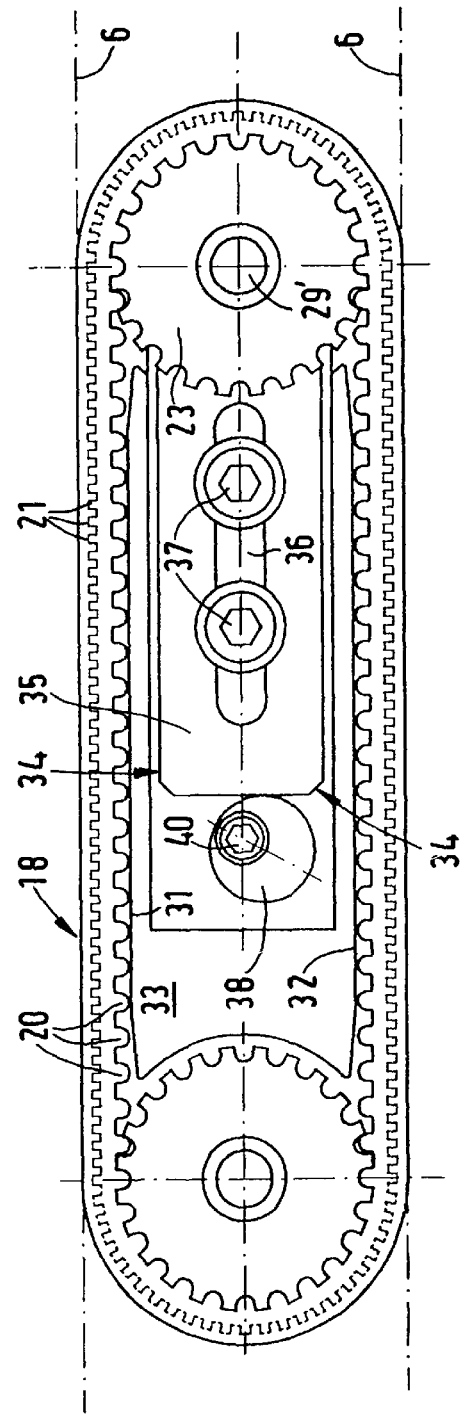
FIG. 13 shows a top view similar to FIG. 12, but with a tensioning device according to FIG. 12 in conjunction with a toothed return sheave.

In the embodiments shown in FIGS. 2 and 13 the return sheave 23 has a toothing 19 corresponding to the toothed pinion 10 and meshing with the internal toothing 20 of the toothed belt 18. In the embodiment according to FIG. 2 the said return sheave 23 is pivoted on a pin 29 fitted to the block of the electric geared motor 11. It can therefore be identical in design to the toothed pinion 10, which reduces the number of different parts of the drive device.

Figure 12:
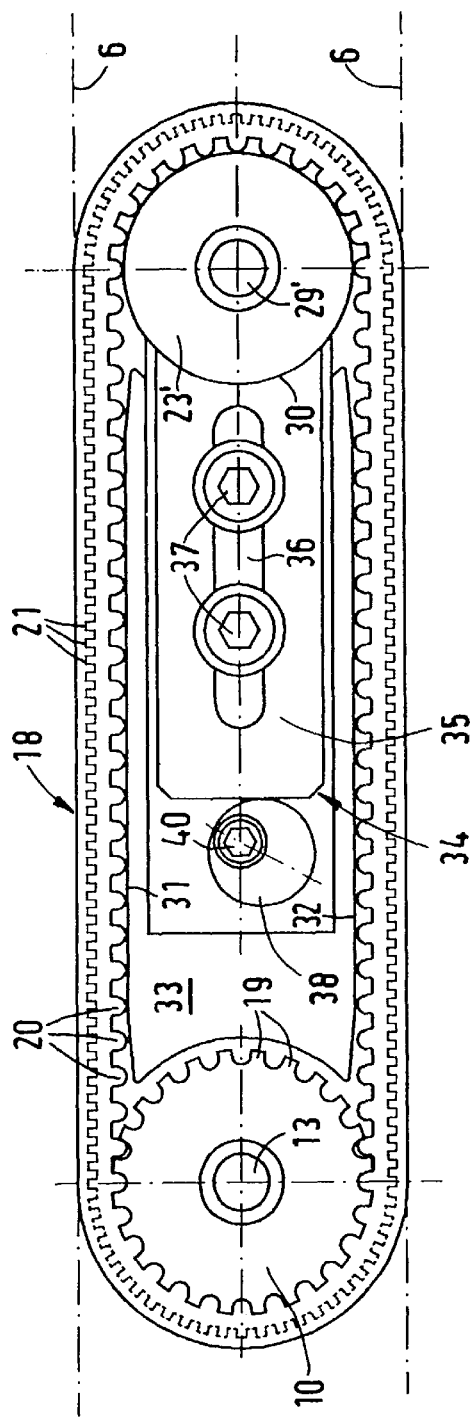
FIG. 12 shows a top view similar to FIG. 10, but with a tensioning device for a non-toothed return sheave.

The return sheave 23' represented in the embodiments according to FIGS. 10 and 12, on the other hand, is of cylindrical design on its outer surface 30 for supporting the internal toothing 20 of the toothed belt 18, the diameter of the return sheave 23' corresponding approximately to the root diameter of the toothing 19 of the toothed pinion 10. In the embodiment according to FIG. 10 the return sheave 23' is in turn pivoted on a pin 29 fitted to the block of the electric geared motor 11.

In the embodiment represented in FIG. 11 the endless toothed belt 18 (18'), after the line sections intended for engagement between its external toothing 21 (21') and the working windings 22 of the drive cables 6, bears on the rounded slide surface 24, which in the example shown extends over an angle of 180° and is formed as a semicylindrical surface, the radius of which is approximately equal to the root radius of the toothing 19 of the toothed pinion 10.

Figure 3:
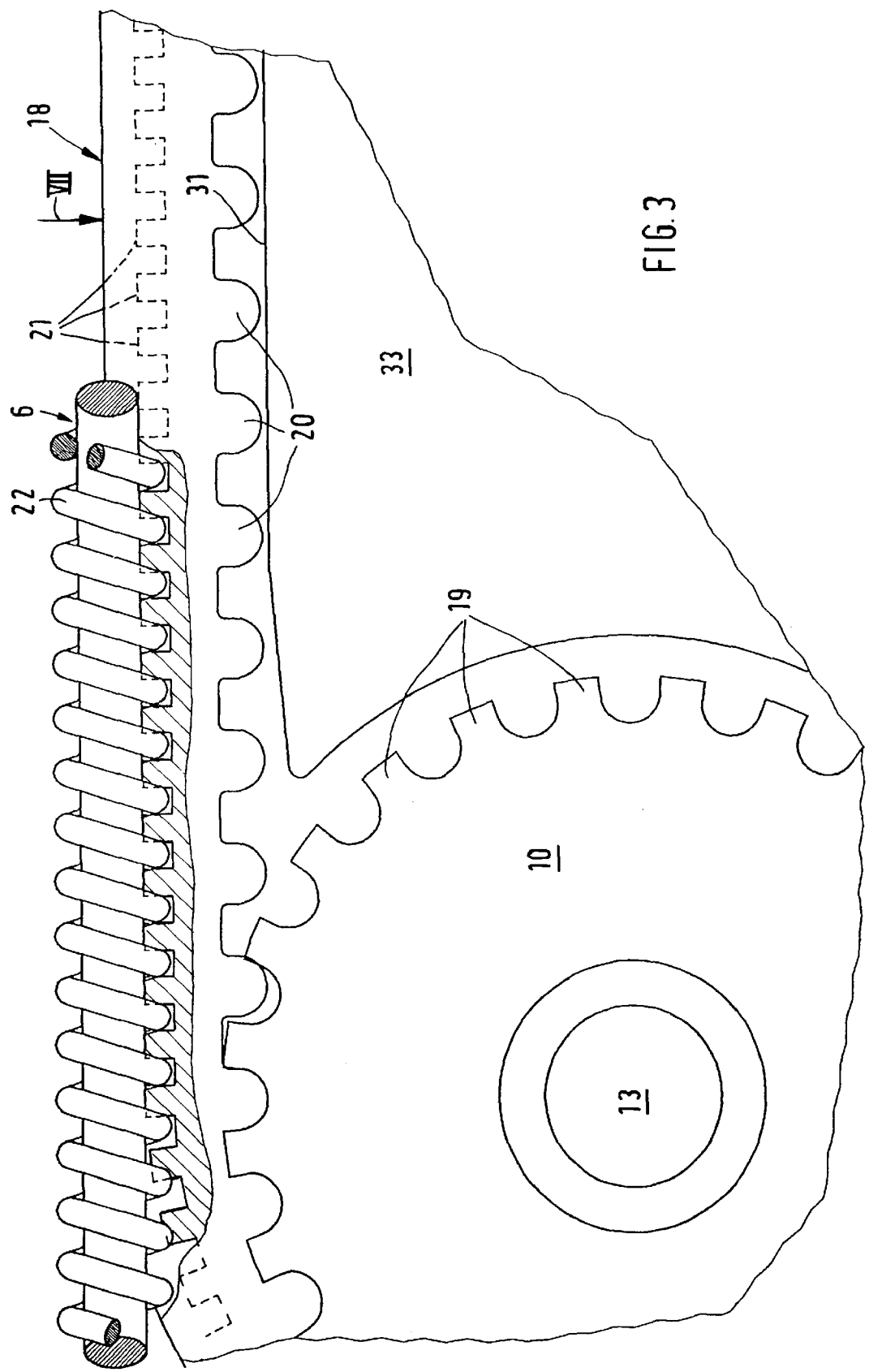
FIG. 3 shows a detached top view of the drive device, enlarged in comparison to FIG. 2.

The toothed belt 18, as will be apparent from FIGS. 2 and 3, for example, is guided in the area of the line sections intended for the engagement of its external toothing 21 with the working windings 22 of the drive cables 6, so that it slides with its internal toothing 20 on opposing support surfaces 31 and 32. The said support surfaces 31, 32 ensure that the engagement of the external toothing 21 with the drive cables 6 is maintained, the cables in turn being supported in the guide channels 7, 8 (FIG. 5).

The slide surface 24 and the support surfaces 31, 32 for the toothed belt 18 are together arranged on a support and guide element 33 fixed between the two drive cables 6, as will be seen from FIG. 11. The said support and guide element 33 is an integral part of the block of the electric geared motor 11 or is fixed thereto, as FIG. 5 clearly shows. The pin 29, on which the return sheave 23 or 23' is pivoted, may also be fitted to the support and guide element 33.

Figure 14:
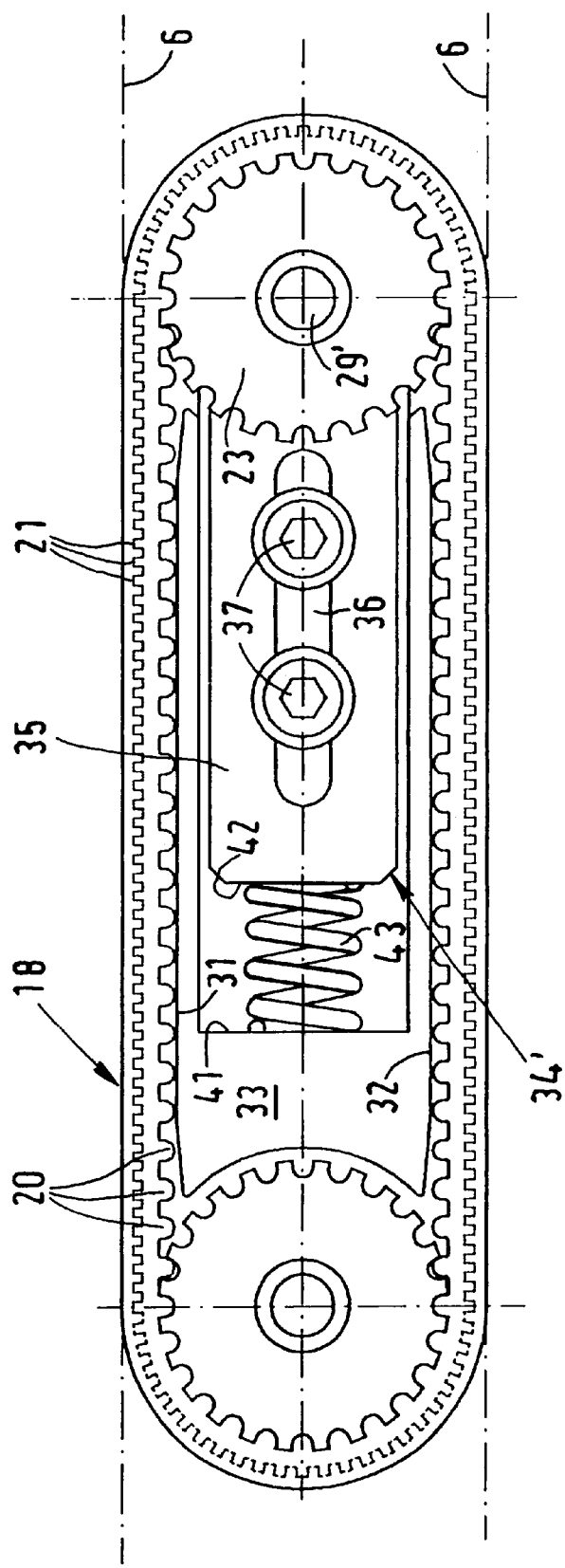
FIG. 14 shows a top view similar to FIG. 13, but with a spring-loaded tensioning device.

For an explanation of a tensioning device, by means of which the tension of the toothed belt 18 can be adjusted, reference is now made to FIGS. 12 to 14. As will be seen, the tensioning device 34 is operatively connected to the pivoted return sheave 23 or 23' in the manner described below. A rounded slide surface may obviously also be used here instead of a return sheave 23, 23', as has been described with reference to FIG. 11 using the reference number 24.

The tensioning device 34 has a tensioning slide 35 guided so that it can slide on the support and guide element 33 parallel to the drive cables 6. The pin 29' for the pivotal support of the return sheave 23 or 23' is fitted to the outer end of the tensioning slide 35. An adjustment slot 36, through which adjusting and fixing screws 37 are passed that can be screwed into the support and guide element 33, provides the facility for a guided slide adjustment of the tensioning slide 35. It will be seen that after slackening the adjusting and fixing screws the tensioning slide 35 is displaceable and adjustable in relation to the support and guide element 33. The set position is secured by tightening the adjusting and fixing screws 37.

In the embodiment according to FIGS. 12 and 13 an adjusting eccentric cam 38 is fixed to the support and guide element 33 so that it is both rotatable and lockable, for the slide adjustment of the tensioning slide 35, the cam bearing on that side of the tensioning slide 35 remote from the return sheave 23 or 23' or the slide surface. After slackening a locking screw 40, the toothed belt 18 is tensioned by turning the adjusting eccentric cam 38 about the axis of the locking screw 40. After the tensioning procedure, the locking screw is tightened.

In the embodiment shown in FIG. 14 a biased compression spring 43 is situated between two facing support surfaces 41, 42 on the support and guide element 33 and on the tensioning slide 35. With the screw 37 slackened, the compression spring 43 acts on the tensioning slide 35 with its spring force and tensions the toothed belt 18. Tightening the screws 37 fixes the adjustment undertaken by spring force. If the tensioning slide 35 is not fixed by screws 37 but merely displaceably guided, the belt tension always remains constant.

As will be seen from FIGS. 4 to 6, downward-pointing guide projections 39 are fitted to the frame cross member 1, which guide the toothed belt 18 in its orbital movement and in so doing prevent upward deflection of the toothed belt 18 under operating conditions. The web 14 of the guide profile section 12 prevents a downward deflection of the toothed belt 18.

In summary, a quiet drive device is thus proposed, capable of withstanding even strong drive forces and permitting an equal, that is to say smooth displacement of the cover of motor vehicle sliding sunroofs. The drive device comprises a toothed belt, which is guided so that two parallel line sections are formed on the toothed belt. On these line sections the toothed belt, with an external toothing extending without interruption over its circumference, is in meshing engagement with the two drive cables for the cover. An internal toothing extending without interruption over its inner circumference is in meshing engagement with a toothed pinion that can be driven to rotate in both directions and is partially wrapped by the toothed belt.

We claim:

1. A drive device for a motor vehicle sliding roof panel, comprising:
   a pinion having a plurality of teeth on an outer surface, the pinion being supported such that the pinion is rotatable;
   a plurality of drive cables, each having an exterior surface with a helical arrangement, the cables being displaceably guided in guide channels where the cables are rigid in compression, at least a portion of the cables being supported on opposite sides of the pinion;
   a flexible belt arranged between the pinion and the drive cables, the flexible belt having an inner side including a plurality of teeth having a configuration that is complimentary to the teeth on the pinion, the belt being at least partially received around the pinion so that corresponding teeth on the inner side of the belt are held in constant frictional engagement with corresponding teeth on the pinion, the belt having an outer side including an external surface contour that is complimentary to the helical arrangement of the drive cables, the flexible belt having opposing sections that are guided parallel to the drive cables such that the exterior configuration on the outer side of the belt along the opposing sections is held in constant frictional engagement with corresponding portions of the helical arrangement of the two drive cables such that rotational movement of the pinion results in opposing displacement movement of the cables.

2. The drive device of claim 1, wherein the inner side teeth on the flexible belt and the teeth on the rotatable pinion are straight-toothed, the external configuration of the flexible belt includes helically arranged teeth corresponding to the helical arrangement of the exterior of the drive cables.

3. The drive device of claim 2, wherein the teeth on the pinion are aligned parallel to an axis of rotation of the pinion and the helically arranged teeth on the exterior of the belt are not parallel to the teeth on the pinion.

4. The drive device of claim 1, including a return support that engages the inner side of the belt at an end of a loop formed by the belt opposite from the rotatable pinion.

5. The drive device of claim 4, wherein the return support comprises a pivoted return sheave.

6. The drive device of claim 4, wherein the return support comprises a return sheave having external teeth cooperating with the teeth on the inner side of the flexible belt.

7. The drive device of claim 4, wherein the return support comprises a rounded slide surface.

8. The drive device of claim 4, wherein the return support is arranged on a support and guide element fixed between the two drive cables.

9. The drive device of claim 1, including support surfaces positioned adjacent the sections of the belt that are intended for engagement with the helical exterior on the drive cables.

10. The drive device of claim 9, wherein the flexible belt is received between the support surfaces and the drive cables such that the flexible belt does not deflect away from the drive cables in the area of the support surfaces.

11. The drive device of claim 1, wherein the exterior surface of the drive cables includes a helically arranged wire.

12. The drive device of claim 1, including an electric motor that drives the rotatable pinion.

13. The drive device of claim 12, including wherein the support and guide elements that are integral parts of the electric motor.

14. The drive device of claim 1, including a tensioning device that is controllable to provide a desired tension on the flexible belt.

15. The drive device of claim 14, wherein the tensioning device includes a biasing member that biases the belt under tension.

16. The drive device of claim 15, wherein the biasing member comprises a spring.

17. The drive device of claim 14, wherein the tensioning device comprises a tensioning slide guided so that it is capable of sliding on a support and guide element parallel to the drive cables, the tensioning slide adjusting the position of a return support member that engages the inner side of the belt opposite from the rotatable pinion.

18. The drive device of claim 17, including an adjusting cam that is supported on the support and guide element so that the cam is rotatable and lockable, the cam bearing on the tensioning slide on a side of the tensioning slide that is remote from the return support member.

19. The drive device of claim 17, including a biased compression spring arranged between the support and guide element and the tensioning slide.

20. A drive device for moving a vehicle roof panel, comprising:

a plurality of drive cables, each having an exterior surface that includes spaced engaging portions that are oblique to an axis of the cable;

a drive pinion having spaced drive members on an exterior of the pinion, the drive members being aligned parallel with an axis of rotation about which the drive pinion rotates;

a flexible belt that is received at least partially around the drive pinion having interior drive members that have a configuration corresponding to the drive members on the exterior of the pinion so that the interior drive members on the belt engage the drive members on the pinion to cause movement of the belt responsive to rotation of the pinion, the belt including an exterior surface having drive members with a configuration corresponding to the exterior of the drive cables, at least a portion of the exterior of the belt engaging a corresponding portion of each of the drive cables such that rotational movement of the pinion causes movement of each of the cables in an opposite direction.

* * * * *